Jan. 13, 1970 C. PIKE 3,489,457

SIDE WINDOW ARM SHADE

Filed Oct. 23, 1967

INVENTOR.
CLYDE PIKE
BY
ATTORNEY

3,489,457
SIDE WINDOW ARM SHADE
Clyde Pike, 3023 Cade St., Long Beach, Calif. 90805
Filed Oct. 23, 1967, Ser. No. 677,399
Int. Cl. B60j 1/20
U.S. Cl. 296—152      4 Claims

ABSTRACT OF THE DISCLOSURE

An arm shade pivotally mounted on the inside of a vehicle side door just below the window.

---

To shade the arms and legs of the passengers of automobiles an adjustable shade is provided which will prevent the sun from shining through the side windows of the automobile onto the passengers. One arm of the driver particularly is exposed to the direct rays of the sun during certain times of the day, and the side window shade can be so tilted to exclude the sun and still not obstruct the driver's view from the side window. The shade can be readily attached to the window molding, and in its lowered position will not interfere with the normal window and door controls of the automobile.

An object of my invention is to provide a novel side window arm shade which can be readily attached to the molding of the automobile side windows, and which can be tilted in a position to shade the passengers' arms or legs when desired.

Another object of my invention is to provide a novel side window arm shade which is simple in construction, inexpensive to manufacture, and which will not interfere with the normal use of the passengers' arms when the shade is in various tilted positions.

Other objects, advantages and features of invention may appear from the accompanying drawing, the subjoined detailed description and the appended claims.

IN THE DRAWING

Figure 1:
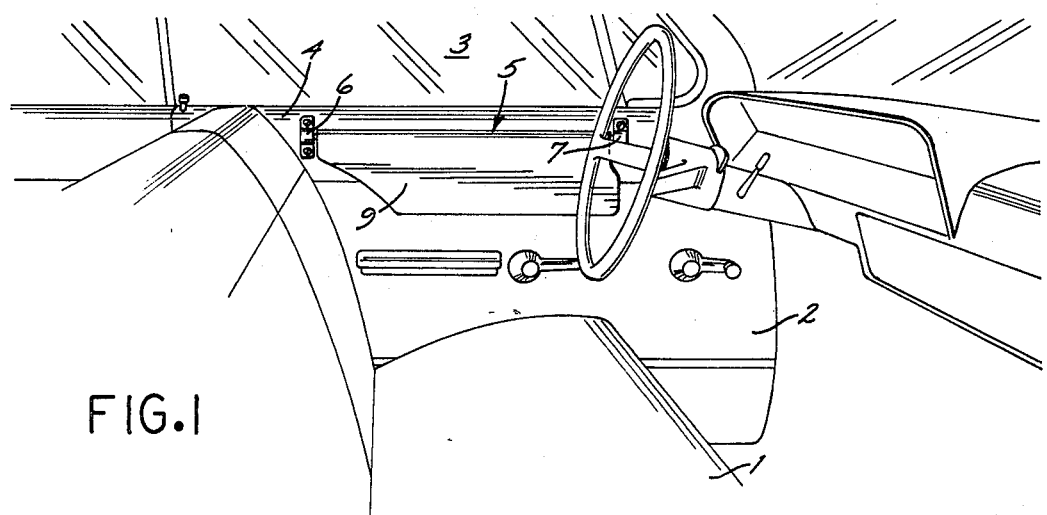
FIGURE 1 is a fragmentary side elevation of the interior of an automobile with my side window arm shade mounted thereon.
Figure 2:
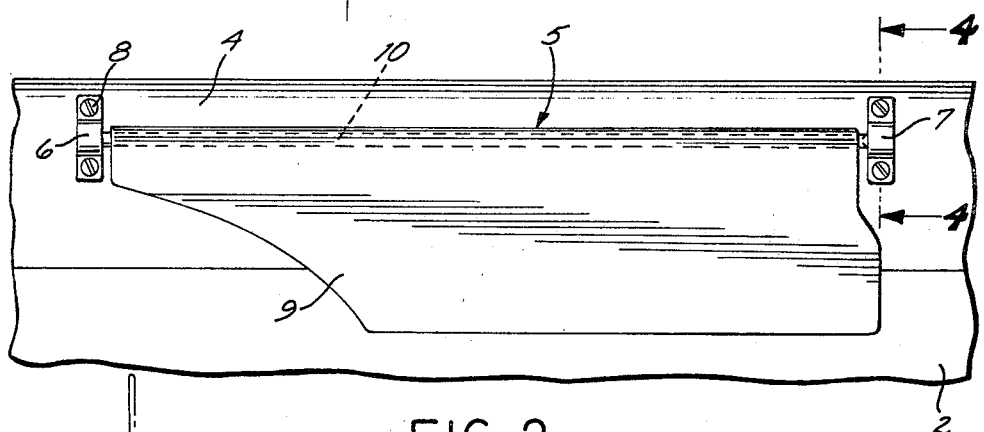
FIGURE 2 is a fragmentary side elevation of my side window arm shade in operative position.
Figure 3:
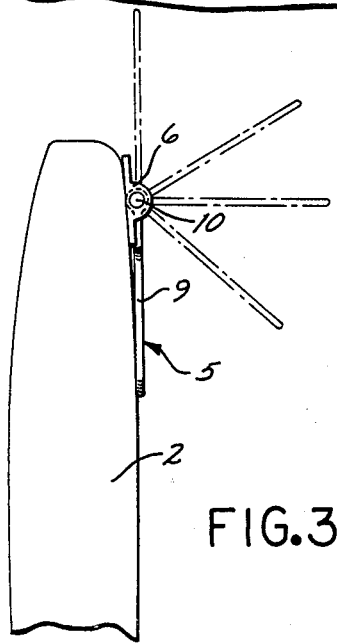
FIGURE 3 is an end view of the side window arm shade in operative position.

Referring more particularly to the drawing, the numeral 1 indicates the usual automobile which includes access doors 2 and side windows 3 thereon. The window 3 is normally provided with molding 4 which surrounds it, and this molding may serve as the attaching structure, as will be subsequently described. The driver of a vehicle is normally required to remain in a particular position in the car while driving and, consequently, the sun will shine through the side window 3 onto his arms or legs, and on a long trip this can be very annoying.

Figure 4:
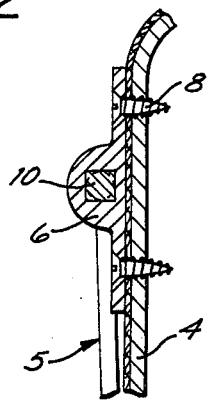
FIGURE 4 is a fragmentary sectional view taken on line 4—4 of FIGURE 2.

To exclude the rays of the sun I provide an arm shade 5 which includes a pair of brackets 6–7 which are attached to the molding 4 by means of suitable screws 8. These screws extend into the molding, as shown in FIG. 4. The shade 9 is relatively narrow and extends from the bracket 6 to the bracket 7. The shade 9 is pivotally attached to the brackets 6 and 7 by means of a rod 10 which extends through the shade 9 and into the brackets 6 and 7, thus enabling the shade to pivot on this rod to either a raised or lowered position, as might be required. As shown in FIG. 1 the shade 9 can be either raised or lowered without interfering with the normal use of the driver's arms, and also will not interfere with any of the door or window controls. Since the shade is positioned at the lower edge of the window 3 and is relatively narrow in its vertical dimension, this shade can be raised or lowered without interfering with the driver's view through the side window 3. The shade 9 is also of sufficient length so that it will effectively exclude most of the sun's rays from entering the side window 3, and particularly will shade the arms and legs of the passenger.

Having described my invention, I claim:

1. A side window arm shade for the side door windows of a vehicle and positioned adjacent the lower edge of the window and on the inside of the vehicle, a pair of horizontally spaced brackets, means securing the brackets to the vehicle door, a shade, and means on the shade pivotally mounting the shade in the brackets.

2. A side window arm shade as recited in claim 1, said means on the shade pivotally mounting the shade comprising a rod extending through the shade and into the brackets.

3. A side window arm shade as recited in claim 1, said shade being of a width to permit a relatively unobstructed side view of the driver of the vehicle.

4. A side window arm shade as recited in claim 1, said means on the shade pivotally mounting the shade, comprising a rod extending through the shade and into the brackets, a molding surrounding the window, and screws extending through the brackets and into the molding to secure the brackets to the vehicle door.

References Cited
UNITED STATES PATENTS

| | | | |
|---|---|---|---|
| 2,596,836 | 5/1952 | Bruhl | 296—97.19 |
| 1,694,552 | 12/1928 | Menczer | 296—97.96 |
| 1,640,088 | 8/1927 | Megown | 296—152 |

PHILIP GOODMAN, Primary Examiner

U.S. Cl. X.R.

296—97